Feb. 4, 1936.   F. V. WALTZ   2,029,902
WEIGHING SCALE
Filed Feb. 9, 1935   2 Sheets-Sheet 1

Foster V. Waltz
INVENTOR

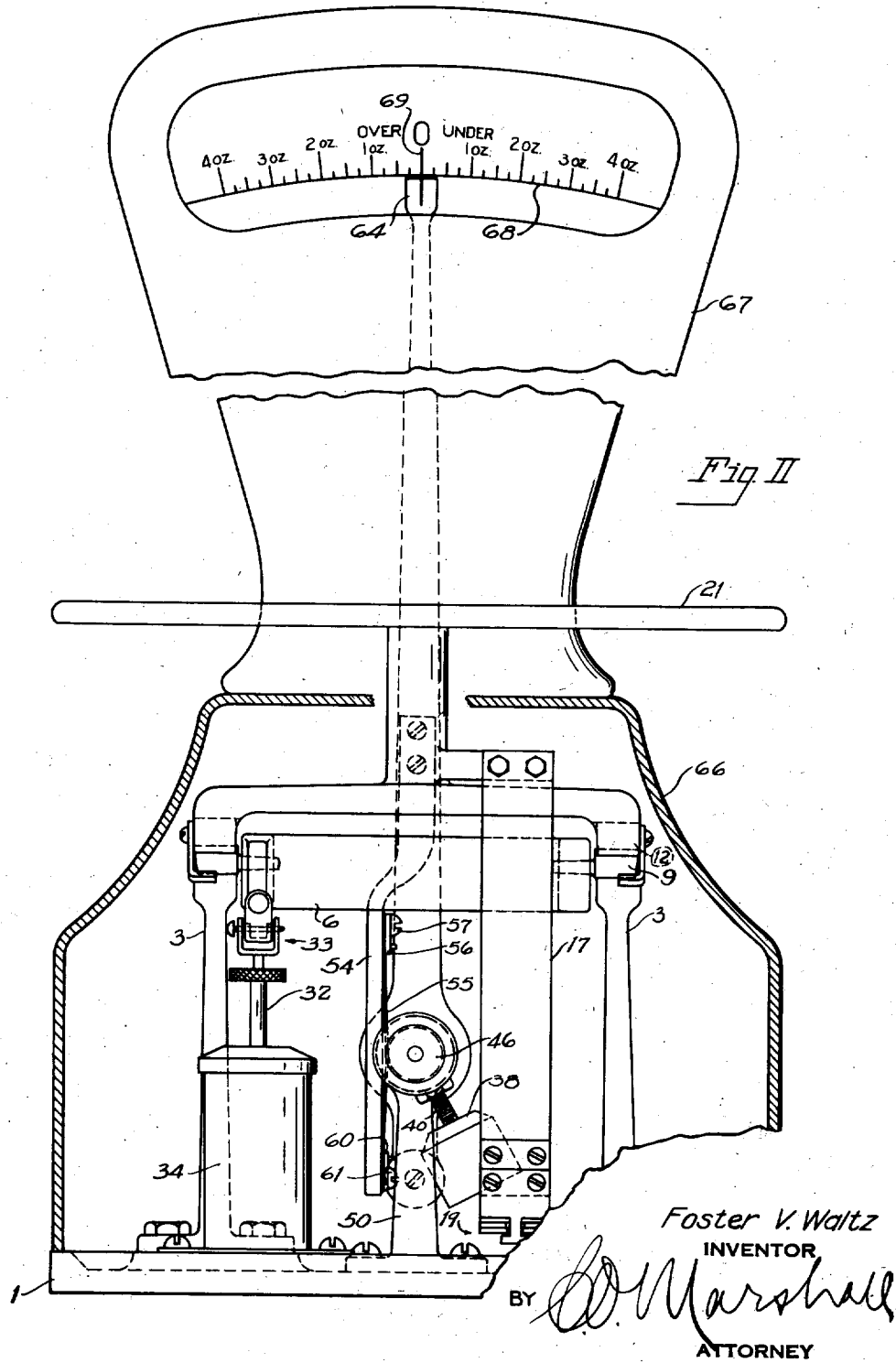

Patented Feb. 4, 1936

2,029,902

UNITED STATES PATENT OFFICE 2,029,902

WEIGHING SCALE

Foster V. Waltz, Toledo, Ohio, assignor to Toledo Scale Manufacturing Company, Toledo, Ohio, a corporation of New Jersey Application February 9, 1935, Serial No. 5,784

7 Claims. (Cl. 265—54)

This invention relates generally to weighing scales and more particularly to weighing scales which are adapted to indicate any excess or deficiency in a predetermined load.

The principal object of the invention is the provision of an improved compact and simple scale of the type referred to.

Another object is the provision of improved means whereby such scale will weigh accurately when placed in an unlevel position.

A further object is the provision of an improved pendulum load counterbalancing system.

Another object is the provision of means whereby indicating mechanism may be variably positioned along the longitudinal axis of the scale to permit variations in the size of the load and counterpoise platters.

These, and other objects and advantages will be apparent from the following specification in which reference is had to the accompanying drawings wherein similar reference numerals designate similar parts throughout the several views.

Referring to the drawings:—

Figure I is a side elevational view of the device, the casing members being sectioned through their center.

Figure II is an enlarged end elevational view of the device, parts being broken away and other parts sectioned to more clearly show the lever, the load supporting and load indicating mechanisms; and, Figure III is an enlarged fragmentary view of the pendulum and pendulum actuating means viewed substantially from a position along the line 3—3 of Figure I.

Referring to the drawings in detail:—

A base 1, preferably a rigid iron casting, is provided with machined pads 2 to which an upwardly extending lever fulcrum frame 3 is securely bolted. In bifurcations of the upper ends of the frame 3, bearings 4, preferably of a semi-precious material such as agate, are fixed to support fulcrum pivots 5 of an even armed lever 6 which is calculated and designed so as to combine the greatest possible rigidity with minimum weight. To limit the transverse movement of the fulcrum pivots 5, on the bearings 4, hardened thrust plates 7 are provided which are fastened by screws 8 to the outer faces of the bifurcated ends of the fulcrum frame 3. In spaced relation to the fulcrum pivot 5 and located adjacent the ends of the lever 6 are load pivots 9 and counterpoise pivots 10. The load pivots 9 support a platter frame 11 which with suitable bearings 12 rests thereon. These bearings 12 are fixed in bifurcations similar to those in the fulcrum frame 3 and are provided with similar thrust plates. A counterpoise plate frame 13, with bearings 14, rests upon the counter poise pivots 10. To projecting bosses 15 and 16, forming portions of the frames 11 and 13 respectively, downwardly extending members 17 and 18 are bolted, their lower ends are engaged by check links 19 and 20. These check links are provided for the purpose of maintaining the condition of level of the load platter 21 and the counterpoise plate 22 which surmount the frames 11 and 13 respectively. The opposite ends of the check links 19 and 20 are secured to downwardly extending members 23 and 24 which, by means of screws 25 and 26, are securely fastened to brackets 27 and 28, adjustably fixed on studs 29 and 30 which extend upward from the base 1 to which they are firmly secured. The check links illustrated are of the so called "French stay" type which is so well known in the art that their construction and function requires no further description. To dampen the vibrations of the lever 6, it is provided with an extending portion 31, adjacent the load supporting pivot, to which the upper end of a plunger rod 32 is connected by means of a universal connection 33. A dashpot body 34 serves as a receptacle for oil, or other fluid medium, in which a plunger disk 35 attached to the lower end of the rod 32 is adapted to dip.

The load counterbalancing pendulums 36 and 37 comprise weights 38 and 39, threaded on stems 40 and 41. These stems 40 and 41 are studded into collars 42 and 43, encircling and locked to horizontally extending shafts 44 and 45. The ends of these shafts 44 and 45 are turned and ground and are mounted in anti-friction ball bearings 46, 47, 48, and 49. The ball bearings 46 and 47 in which the shaft 44 is mounted are fixed in the upper ends of bearing brackets 50 and 51, while the bearings 48 and 49, supporting the shaft 45, are similarly supported in brackets 52 and 53. These brackets are securely positioned upon the base 1.

To operatively connect the pendulum 36 to the load supporting mechanism a downwardly extending member 54 is fastened to the load platter frame 11. This member 54 has a flat place which is positioned parallel to and facing the shaft 44. To the upper end of this face the upper end of a flexible metallic ribbon 55 is fastened by means of a clamp plate 56 and a screw 57. The lower end of this ribbon 55 extends over a portion of the periphery of the shaft 44 and is fastened thereto by clamp plate 58 and screw 59. A similar ribbon, extending in the opposite direction, having its lower end clamped to the lower end of the member 54 by means of the plate 60 and screws 61 and having its upper end fastened to the shaft 44 by means of plate 62 and screws 63, is also provided so that the reciprocating movement of the frame 11, occasioned by a load being placed on or removed from the platter 21, is directly transmitted to the shaft 44 and the thereto attached pendulum 36. The two ribbons extending in opposite directions serve to obviate any and all lost motion.

Since the scale is of the even balance type a counterpoise (not shown) is placed on the counterpoise platter 22 to offset the weight of a predetermined load. The pendulum load counterbalancing arrangement comprising the pendulums 36 and 37 is provided to counterbalance that portion of the weight which is in excess of the predetermined weight or to determine the amount deficient therefrom. To indicate the overage or deficiency of the load an indicator 64 is secured by means of a hub clamp 65 to the shaft 44 and thus partakes of the movement of the pendulum 36. This indicator 64 extends upwardly from the shaft through an opening 65 in a casing 66 which is provided to house the mechanism mounted on the base 1, into an indicator housing 67 surmounting the casing 66. This housing 67 has a chart 68 stationed in its upper end. The chart 68 bears a zero graduation 69 substantially in its center to indicate exact equilibrium of the load and counterpoise and a series of graduation marks and value numerals to indicate the amount of deficiency or overage of the load in the known manner.

The scale thus far described is well adapted to accurately determine and indicate the weight of a load placed on the load receiver 21. When, however, the scale is in an unlevel position, in common with other single pendulum scales, it will not weigh or indicate accurately due to the fact that the equilibrium of the scale has been disturbed by the pendulum 36 which under the influence of gravity has changed its position. To obviate the errors which are caused by an unlevel position, the pendulum 37 is fastened to the shaft 45 in a manner similar to one in which the pendulum 36 is secured to the shaft 44 but its center of gravity is on the opposite of a vertical plane which passes through the axes of the shaft 44 and 45 so that its moment, although equal, is opposite to the moment of the pendulum 36 and acting through the medium of a ribbon 70 and a member 71 which corresponds to the member 54 connected to the pendulum 36 and the lever 6.

When the scale is placed in an unlevel position the angle of the pendulum stem 40, from the vertical, will either increase or decrease and the indicator 64, being directly connected to the pendulum through the shaft 44, will partake of this movement and thus indicate incorrectly. The pendulum 37 exerting opposite force on the lever 6, to which both of the pendulums are connected, will compensate for the change of moment of the pendulum 36 and thus return the indicator to its correct zero position with reference to the chart 68.

Frequently it is desired, in constructing scales of the type herein described, to provide load receivers of special design and dimensions to accommodate certain kinds of commodities. It has been one of the objects of this invention to provide means whereby the housing 67 may be kept adjacent the edge of the load receiver 21 as is desirable and yet vary its dimension. To accomplish this, a portion 73 of the shaft 44 is machined concentric and of a smaller diameter than the rest of the shaft, so that the hub 65, to which the indicator 64 is fastened, may be selectively positioned thereon and the opening 65 in the casing 66 and the opening 72 in the casing 67 are so proportioned that when the position of the indicator on the shaft 44 is changed the position of the housing 67 may be changed correspondingly and yet cover the opening 65 in the casing 66 and not present a "make shift" appearance. It is necessary to shift the indicator when the housing 67 is shifted since the chart 68 is stationarily fastened thereto and the design of the indicator is such that it must be positioned directly in the plane of the chart.

Having described my invention, I claim:—

1. In a device of the class described in combination, an oscillatively mounted lever, a load support mounted upon said lever, a counterpoise support, to act in opposition to a load on said load support and connected to said lever, a pendulum mounted below said lever and adapted to oscillate in a plane bisecting the plane of oscillation of said lever, the moment of said pendulum being additive to the weight moment of a counterpoise on said counterpoise support, and an indicator secured to said pendulum to indicate weight of loads on said load receiver.

2. In a device of the class described in combination, a base, a two-armed lever mounted upon said base for oscillation in one direction, a pendulum mounted below said lever for oscillation in another direction, indicating members comprising a relatively movable chart and indicator cooperating with said lever, one of said members being attached to and actuated by said pendulums and extending upwardly between the arms of said lever.

3. In a device of the class described in combination, a base, a lever mounted upon said base, a pair of independent shafts mounted antifrictionally in longitudinal coincidence upon said base and below said lever, load offsetting means attached to said shafts and means including flexible members connected to said lever and said shafts for imparting equal but opposite movement to said load offsetting means upon movement of said lever.

4. In a device of the class described in combination, a base, a lever mounted upon said base, a load receiver pivotally mounted upon said lever, a load offsetting pendulum pivotally mounted below said load receiver and below said lever, said pendulum having a portion substantially concentric to its pivotal axis and means operatively connected to said lever and to said substantially concentric portion of said pendulum forming a non-lost-motion connection.

5. In a device of the class described in combination, a base, a lever mounted upon said base, a load receiver pivotally mounted upon said lever, a load offsetting pendulum pivotally mounted below said load receiver and below said lever, said pendulum having a portion substantially concentric to its pivotal axis and means operatively connected to said lever and to said substantially concentric portion of said pendulum forming a non-lost-motion connection, said means comprising a flat surface connected to said lever and a plurality of flexible metallic ribbons having ends connected to said flat surface and other ends to said substantially concentric portion of said pendulum.

6. In a device of the class described in combination, a base, a lever mounted upon said base, a load receiver pivotally mounted upon said lever, a load offsetting pendulum pivotally mounted below said load receiver and below said lever, said pendulum having a portion substantially concentric to its pivotal axis and means operatively connected to said lever and to said substantially concentric portion of said pendulum forming a non-lost-motion connection, said means comprising a flat surface connected to said lever and a plurality of flexible metallic ribbons having ends connected to said flat surface and other ends to said substantially concentric portion of said pendulum, said ribbons extending in opposed directions.

7. In a device of the class described in combination a base, scale mechanism including an indicator mounted thereon, said indicator being operatively connected to said scale mechanism and adapted to be moved along an axis, into different positions with respect to a point on such axis, a plurality of casings for housing said scale mechanism and said indicator and means integral with said casings whereby said casings are adapted to be moved relatively to each other to house said indicator when said indicator is moved along such axis.

FOSTER V. WALTZ.